Figure 1:
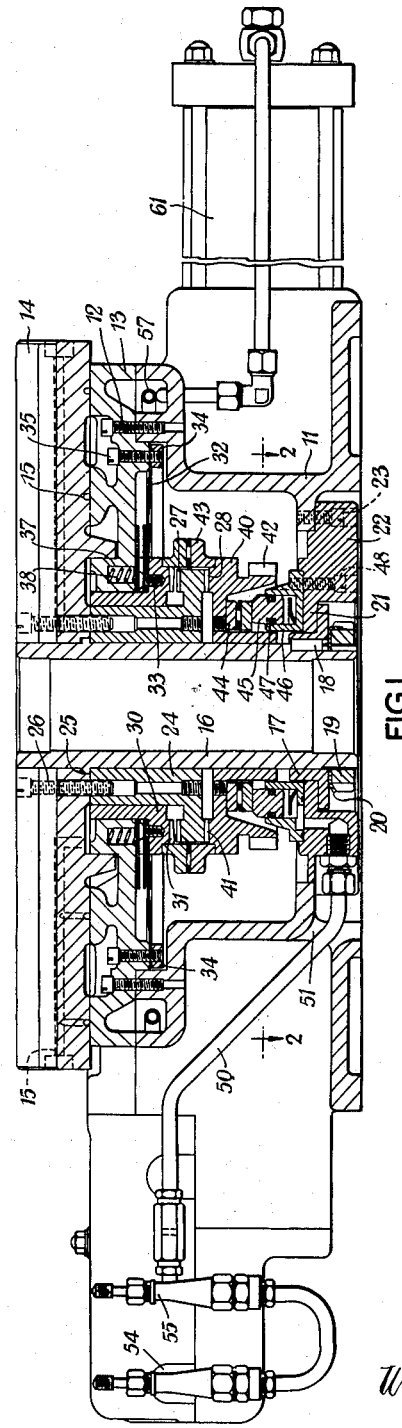

March 21, 1961 W. D. SAMUEL 2,975,657
INDEXING MECHANISM FOR MACHINE TOOLS
Filed March 26, 1959 2 Sheets-Sheet 1

Inventor
*Walter Daniel Samuel*
By *Bacon & Thomas*
Attorneys

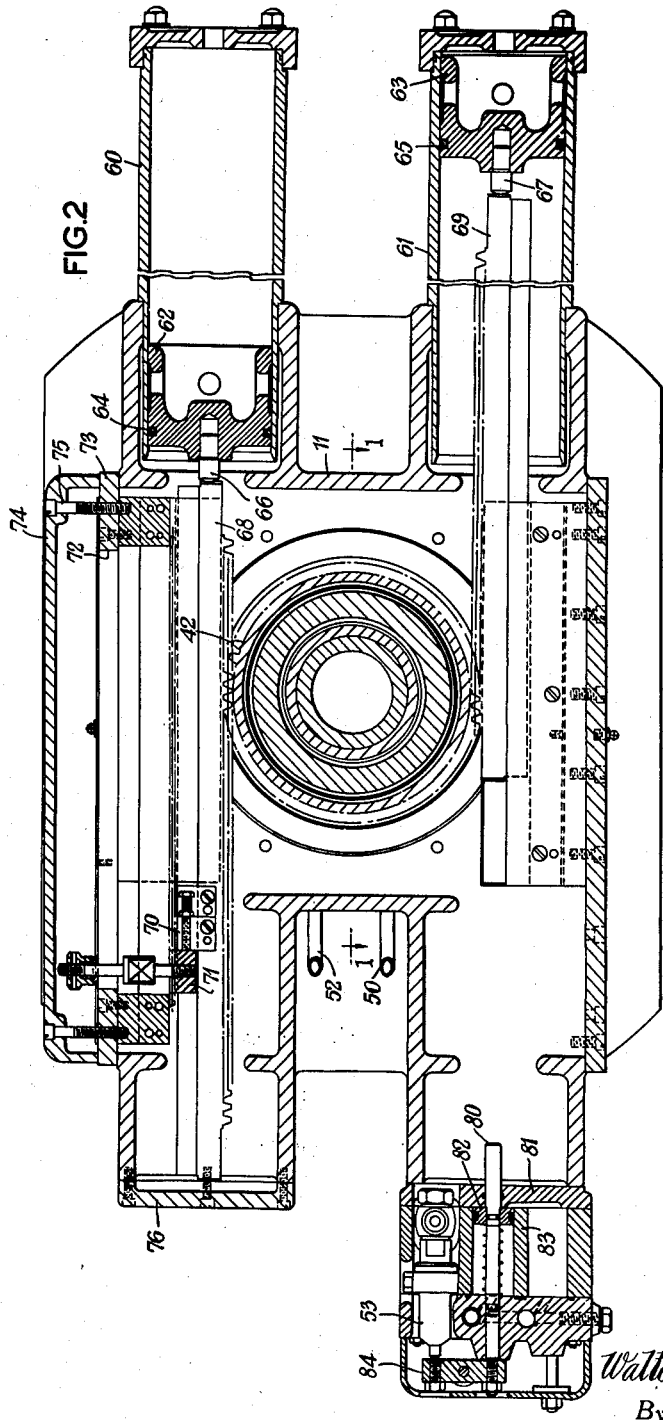

United States Patent Office 2,975,657
Patented Mar. 21, 1961

2,975,657
INDEXING MECHANISM FOR MACHINE TOOLS

Walter D. Samuel, Hemel Hempstead, England, assignor to Centec Machine Tools Limited, Hemel, Hempstead, England, a British company Filed Mar. 26, 1959, Ser. No. 802,123

12 Claims. (Cl. 74—822)

This invention relates to an improved dividing or indexing table and is concerned more particularly with the operating and control mechanism therefor.

It is an object of the invention to provide improved dividing and indexing mechanism which enables the table to be indexed accurately and precisely over a large range of angles, for example in successive steps of say 2° or 3° or indeed any other desired angle.

According to the invention there is provided a rotary indexing or dividing table comprising a driving member, a driven member operatively connected to said table and a non-rotatable member mounted for movement axially of said table into and out of engagement with said driven member, said non-rotatable member serving upon engaging said driven member finally to adjust said table into a desired angular position.

The table further includes means for locking it in position after each completed indexing movement and preferably said non-rotatable member serves upon engagement with the said driven member to lock the table in position.

In order to ensure that said non-rotatable member is free to move axially but is prevented from making any rotary movements which would reduce the accuracy of the indexing steps it is preferred to connect said member to a flexible steel diaphragm of annular shape which diaphragm is secured at its outer periphery to the frame in which the rotary table is mounted. It will be understood that whilst the diaphragm which extends around the axis of rotation of the table can flex axially thereof its inherent rigidity in its own plane effectively prevents any rotation taking place.

The axial movements of the non-rotatable member can be effected under air pressure by arranging for the said diaphragm to enclose an air space in the frame of the device to which air under pressure can be admitted when it is desired to move the said member axially into engagement with the driven member. It is, however, preferred to effect this axial movement by spring means so that the final setting movement of the table and particularly the locking movement can be effected independently of air pressure with the result that even when air pressure is cut off for instance at the end of a day's shift the table will be positively held in position.

Preferably the driving member, the driven member and the said non-rotatable member are each in the form of annular members having teeth on their interengaging horizontal faces which extend around the periphery of the members.

Thus said driving member has such teeth on its upper surface for engagement with corresponding teeth on the under surface of the driven member for rotating the table. The driven member has further teeth on its upper surface for engagement with teeth on the under surface of said non-rotatable member when the latter is moved into engagement with the driven member.

The said members may each have say one hundred any twenty teeth equally spaced around the members and it will be appreciated that by accurately cutting these teeth a very fine degree of precision in setting the table can be achieved. The driving and driven member co-operate to rotate the table to a desired position whereafter these members are disengaged and the teeth on the non-rotatable member engage those of the driven member finally to set the driven member and thus the table accurately in position and lock it there. It will further be understood that any inherent error in the pitch of the teeth on these members extending around the whole periphery of the members will average out so that a very accurate setting of the table is achieved.

Means are provided for moving said driving member into and out of engagement with said driven member and preferably said driving member and said non-rotatable member are operatively associated with one another e.g. through a thrust bearing so that they can be alternately engaged and disengaged from said driven member.

The driving member may be spring-urged into engagement with the driven member but preferably is pneumatically actuated and is formed with peripheral radial teeth which engage with teeth formed on an actuating rack operatively associated with the piston of an air or hydraulic cylinder. The rack carries a stop block which is arranged to engage an adjustable return stop, whereby the traverse of the rack and hence the rotation of the table member is determined. A second or return rack, also pneumatically or hydraulically operated may be provided and be arranged parallel to the first rack to engage the teeth of the driving member diametrically opposite the point of engagement therewith of the first rack.

A preferred embodiment of the invention, will now be described in detail, with reference to the accompanying drawings, of which:

Figure 1 is a vertical section through the centre of the table, and Figure 2 is a horizontal section on the line 2—2 of Figure 1.

The table comprises a base frame 11 having attached thereto by screws 12 a face plate 13 on which the table member 14 rests. The table member is formed with oil holes 15 to direct oil to the engaging surfaces of the face plate and table member. A centre post 16 in the form of a tube is mounted in the base frame and projects above the face plate 13 to serve as a centre bearing for the table member. It is secured at the lower end by an L-ring 17 keyed as at 18 to the post 16 and held by a locknut 19 and washer 20, the L-ring bearing against an inwardly directed flange 21 of a bottom plate 22 screwed as at 23 to the base frame.

An annular driven clutch member 24 surrounds the post and is positioned thereon at its upper end by a flange 25 on the centre post 16. The clutch member 24 which is secured to the table member 14 by a series of screws 26 arranged in an annular ring has teeth 27 and 28 on its upper and undersides respectively. These teeth which are accurately cut extend around the whole periphery of the member 24. An annular brake member 30 which is movable axially of post 16 but which is non-rotatable surrounds the driven clutch member 24 and is also formed with a continuous series of accurately cut teeth 31 on its underside. It is of L-cross section and the one limb is secured to a steel circular diaphragm 32 by means of screws 33, the outer periphery of the diaphragm being clamped between the face plate 13 and a retaining ring 34 by means of screws 35. The face plate 13 is formed with an annular series of recesses 37 carrying compression springs 38 bearing on the upper side of the diaphragm 32. The diaphragm 32 effectively prevents any tendency of member 30 to rotate whilst permitting it to move axially under the influence of the compression springs 38.

An annular driving clutch member 40 embracing the post 16 is formed with a series of annular teeth 41 on its upper side adapted to mesh with teeth 28 on driven clutch member 24 and also has a series of radial or spur teeth 42. The non-rotatable brake member 30 and the driving clutch member 40 are spaced apart by a spacer or annular needle-type thrust bearing 43. Below the driving clutch member 40 is arranged an annular needle-type thrust bearing 44 which rests on an annular piston 45 sealed in a cylinder 46 by O-rings 47 the cylinder being secured by screws 48 to the bottom plate 22.

Oil or air under pressure is admitted to the cylinder 46 from a pipe 50 passing through an aperture 51 in the base frame 11, admission of fluid being under the control of a control valve 53, whilst the rate of admission is controlled by a pair of metering valves 54 and 55. A second pipe 52 operates a spring return pilot valve (not shown).

The base frame supports a pair of cylinders 60 and 61 in which operate pistons 62 and 63 respectively, each sealed by an O-ring 64 and 65. The pistons carry pressure pins 66 and 67 which bear against the end faces of opposed power racks 68 and 69 the teeth of which engage the spur teeth 42 of the driving clutch member 40. One rack 68 slides in a housing of the base frame and carries a stop block 70 adapted to engage an adjustable stop 71 movable in the housing and adjustable through an opening 72 of a plate 73 enclosed by a cover plate 74 held by screws 75. The end of the housing is enclosed by a cover plate 76.

The opposite power rack 69, at the end of its stroke bears against a spring pressed plunger 80 projecting through an end plate 81 secured to the base frame and is secured to a piston 82 in a cylinder 83, the plunger actuating a rocker arm 84 to actuate the control valve 53. As the one rack is being operated the opposite rack is returned to its start position by rotation of the driving clutch member.

In operation air under pressure is admitted to cylinder 46. Piston 45 urges the driving member 40 into engagement with the teeth on the underside of the driven member 24. This movement simultaneously disengages the driven member 24 from the non-rotational member 30 through the intermediary of the thrust bearing 43 and the upward axial movement of member 30 compresses springs 38. Upon completion of movement of piston 45 the build up of pressure therebehind actuates the above mentioned spring return pilot valve (not shown) via pipe 52 which valve then serves to admit air to cylinder 61 and to exhaust air from cylinder 60. Movement of piston 63 in cylinder 60 causes rack 69 to rotate driving member 40 and hence, via driven member 24, the table. This rotatation continues until rack 69 abuts against plunger 80 when the rotation ceases and valve 53 is actuated.

Actuation of valve 53 serves to exhaust air from cylinder 46 whereupon the compressed springs 38 urge non-rotatable member 30 axially downwardly. This movement, through the intermediary of thrust bearing 43 disengages the driving member 40 from driven member 24 and urges piston 45 back into cylinder 46. As the teeth 31 on non-rotatable member 30 engage in teeth 27 on the upper side of driven member 24 they cause the latter to make any necessary final adjusting movements to set the table at the desired angular position and upon engagement these two sets of teeth lock the table in position until air under pressure is again applied to cylinder 47.

The drop in pressure in cylinder 46 after the locking of the table allows the said spring return pilot valve to return to its normal position when air will be exhausted from the power rack cylinder 61 and pressure will be applied to the return rack cylinder 60, to effect return rotation of the driving clutch member. This continues until the stop block 70 on the end of the power rack 68 engages the adjustable stop member 71, when rotation ceases and the device is ready for the next indexing operation. The distance between the end cover plate 81 and the end of power rack 69 is determined by the position of stop member 71 which limits the above return movement and hence determines also the angle through which the table is rotated on the next operation. By adjusting the position of the stop member in its slot, the degree of rotation of the table can be varied as desired.

It will be seen that there is provided an indexing or dividing table which is extremely accurate in operation and in which the usual errors due to play or misalignment in locking plungers or indexing plates is avoided.

I claim:

1. A rotary indexing table comprising, a frame, a table rotatably mounted on said frame but restrained against axial movement thereon, a driven member fixed on said table, a driving member selectively engageable with said driven member, a non-rotatable brake member mounted on said frame for movement axially of said table into and out of locking engagement with said driven member, and interengaging means on said brake member and said driven member, operable when said brake member is moved into engagement with said driven member to accurately position said table in a desired angular position and to lock said table in said position.

2. A rotary indexing table comprising, a frame, a table rotatably mounted on said frame but restrained against axial movement thereon, a driven member fixed on said table, a driving member selectively engageable with said driven member, an annular flexible metal diaphragm arranged concentric to said table and fixed at its outer periphery to said frame with its inner periphery being movable axially of said table, a brake member carried thereby at said inner periphery and axially movable therewith into and out of locking engagement with said driven member, and interengaging means on said brake member and said driven member, operable when said brake member is moved into engagement with said driven member to accurately position said table in a desired angular position and to lock said table in said position.

3. A rotary indexing table comprising, a frame, a table rotatably mounted on said frame about a fixed axis but restrained against axial movement thereon, a driven member fixed on said table and concentric to said axis, an axially movable driving member selectively engageable with said driven member for rotating said table, a resilient annular metal diaphragm arranged concentric to said axis and having its outer periphery non-rotatably fixed to said frame, the inner periphery of said diaphragm being movable axially and having a brake member fixed thereon, said brake member being axially movable into and out of locking engagement with said driven member, and spacing means between said driving member, and said brake member whereby when one is moved into engagement with said driven member the other is forced out of engagement therewith.

4. A rotary indexing table as defined in claim 3 including power means for moving said driving member into engagement with said driven member, and spring means biasing said brake member into engagement with said driven member.

5. An indexing and dividing table as claimed in claim 1 in which spring means are provided which serve to urge said non-rotatable brake member into engagement with said driven member.

6. An indexing or dividing table as claimed in claim 1 in which fluid motor means are provided for effecting axial movement of said non-rotatable brake member.

7. An indexing or dividing table as claimed in claim 1 in which said driving member, driven member and said non-rotatable brake member are each provided with an annulus of teeth extending around their interengaging surfaces.

8. An indexing or dividing table as claimed in claim 1 in which said non-rotatable brake member and said driving member are spaced from one another on either side of said driven member by means of a spacer whereby axial movement of one of said members will cause the other member to engage with or disengage from said driven member.

9. An indexing or dividing table as claimed in claim 8 including an annular piston adapted to impart axial movement to said driving member.

10. An indexing or dividing table as claimed in claim 1 in which said driving member has peripheral teeth engaged by a fluid motor operated actuating rack for rotating said driving member in at least one direction.

11. An indexing or dividing table as claimed in claim 10 in which said rack carries a stop block adapted to engage an adjustable return stop whereby the traverse of the rack and thereby rotation of the table is predetermined.

12. An indexing or dividing table as claimed in claim 10 in which a second rack is arranged parallel to the first rack to engage the teeth of said driving member diametrically opposite its engagement with said first rack for rotating said driving member in the other direction.

References Cited in the file of this patent

UNITED STATES PATENTS

| | | |
|---|---|---|
| 1,745,460 | Sudhoff | Feb. 4, 1930 |
| 1,968,990 | Carlson | Aug. 7, 1934 |
| 2,309,998 | Tucker | Feb. 2, 1943 |
| 2,369,209 | Bullard et al. | Feb. 13, 1945 |
| 2,672,773 | Schofield | Mar. 23, 1954 |
| 2,874,595 | Foster | Feb. 29, 1959 |
| 2,921,487 | Schabot | Jan. 19, 1960 |